United States Patent [19]

Spoto

[11] Patent Number: 5,778,542

[45] Date of Patent: Jul. 14, 1998

[54] RELATIVE POSITION INDICATOR

[75] Inventor: Louis M. Spoto, Sleepy Hollow, Ill.

[73] Assignee: Illinois Tool Works Inc., Glenview, Ill.

[21] Appl. No.: 658,867

[22] Filed: May 31, 1996

[51] Int. Cl.$^6$ .............................. G01B 11/02; H03M 1/22
[52] U.S. Cl. ........................ 33/1 D; 33/1 N; 33/707; 33/613
[58] Field of Search .................. 33/1 D, 1 N, 706, 33/707, 613, 623, 626, 645

[56] References Cited

U.S. PATENT DOCUMENTS

| | | | |
|---|---|---|---|
| 2,659,072 | 11/1953 | Coales et al. | 33/706 |
| 3,945,129 | 3/1976 | Bergkvist | 33/1 N |
| 4,288,056 | 9/1981 | Bergstrom | 33/365 |
| 4,336,659 | 6/1982 | Bergkvist | 33/395 |
| 4,343,090 | 8/1982 | Bergkvist | 33/395 |
| 4,739,164 | 4/1988 | Burkhardt | 33/700 |
| 4,786,891 | 11/1988 | Ueda et al. | 33/707 |
| 4,995,169 | 2/1991 | Lunden | 33/1 N |
| 5,287,630 | 2/1994 | Geisler | 33/706 |

*Primary Examiner*—Christopher W. Fulton
*Attorney, Agent, or Firm*—Schwartz & Weinrieb

[57] ABSTRACT

Apparatus is provided for giving a visual indication of increments of position over a predetermined range of positions to either side of and including a predetermined zero reference point. The apparatus includes a plurality of pattern generating units, each including first and second surfaces, each of these first and second surfaces having a plurality of spaced-apart opaque areas having translucent areas therebetween. The second surface is superimposed upon the first surface for creating a plurality of patterns in response to movement therebetween. The plurality of pattern generating units are arranged adjacent one another and are respectively configured for producing a unique and identifiable set of patterns for each of a plurality of increments over a predetermined range to either side of and including a predetermined zero reference point.

20 Claims, 2 Drawing Sheets

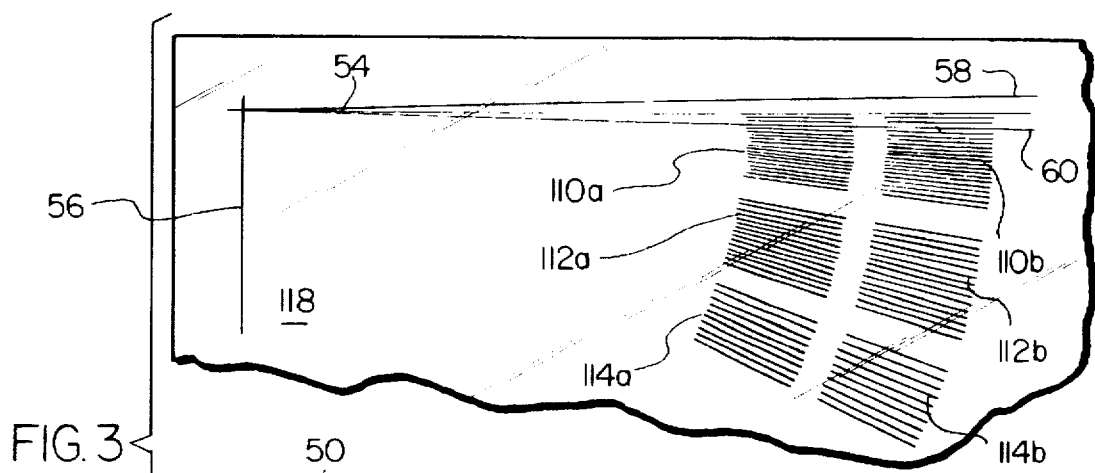
FIG. 3
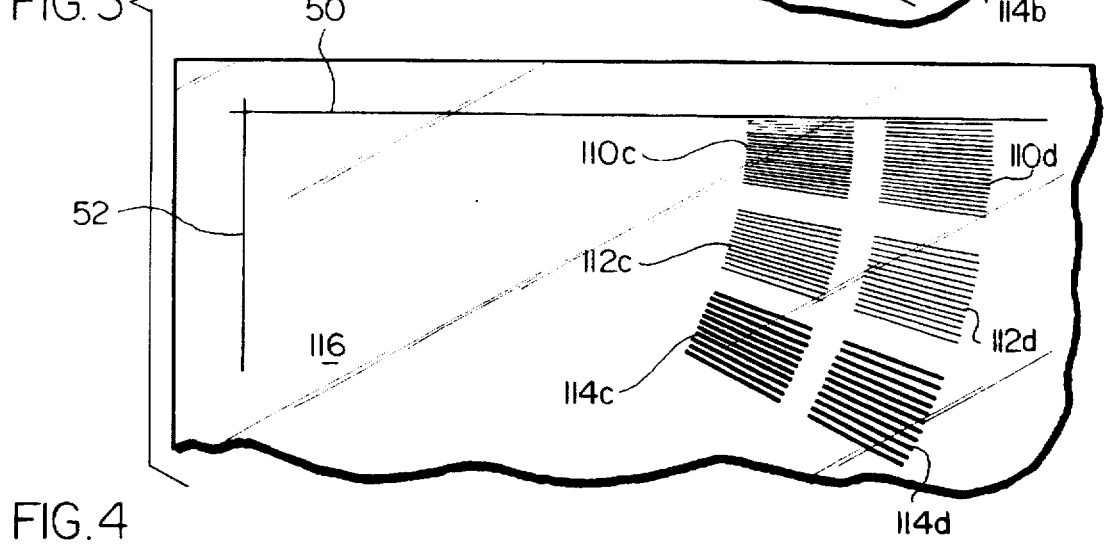
FIG. 4
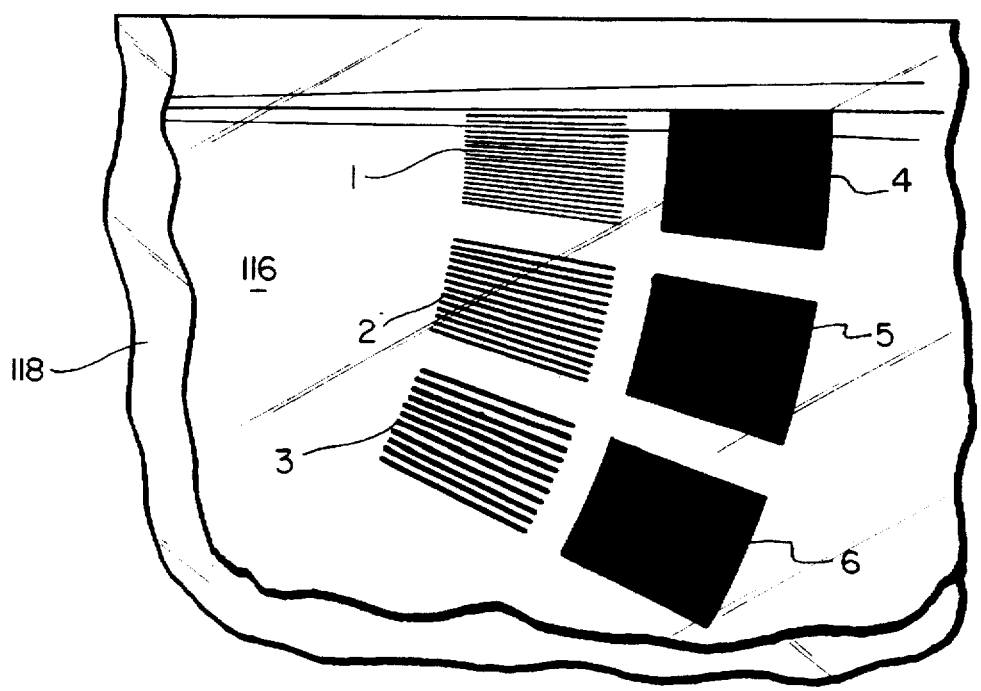

5,778,542

1

RELATIVE POSITION INDICATOR

FIELD OF THE INVENTION

The invention concerns a novel apparatus for providing a visual indication of the relative positions of, or offset between, two members. More specifically, the invention provides a novel indicator which utilizes a plurality of patterns to indicate a predetermined number of increments of offset or movement between two members over a predetermined range to either side of a predetermined zero reference point. The invention also extends to a novel form of pattern generator for use in such an indicator apparatus.

BACKGROUND OF THE INVENTION

While the invention may find use over a wide variety of applications, the description of the invention will be facilitated by specific reference to the problem of providing level or aiming indicators for automotive vehicle headlamp systems. Regulations currently exist in the United States for vehicle headlamp aiming devices (VHAD) which provide standards for headlamp aim inspection and adjustment about both the vertical and horizontal axes. In the case of vertical inclination, these regulations (49CFR, Ch.V) provide that "references and scales" shall be provided in the VHAD to assure correct vertical aim including an equal number of graduations, each graduation representing 0.19 degree (1 in. at 25 ft.) to provide for variations in aim at least 1.2 degrees above and below the horizontal. For horizontal aim, these regulations provide that each graduation shall represent a change in horizontal position not greater than 0.38 degree to provide for variations in aim of at least 0.76 degree to the left and right of the longitudinal axis of the vehicle.

Among level indicators which have been used in the past, perhaps most common is the spirit level or so-called "bubble" level. Such levels tend to be relatively bulky, in addition to having a degree of fragility, that is, the container for the liquid and bubble may be fractured or damaged, leading to loss of liquid and thus, to loss of function of the level. Moreover, the reading must be taken on the bubble itself, which presents some difficulty. Since the bubble will normally have some considerable length or width, even with finely marked graduations on the transparent housing, it may be difficult to determine the correct reading. That is, will the reading be taken from one edge of the bubble consistently, or from an estimated center line of the bubble? Moreover, bubble levels tend to be relatively easy to jar and disturb, thus making readings even more difficult to obtain.

Also, bubble levels are temperature-sensitive. That is, the liquid will expand with increasing temperature, causing the bubble to shrink and vice-versa. This can cause inconsistencies among readings taken at different ambient temperatures. Special liquids can be specified to minimize this effect; however, this can be relatively expensive when dealing with the wide temperature ranges specified for automotive applications.

A number of patents have heretofore disclosed the use of various moiré patterns for indicating a level condition or lack thereof. Among these patents are U.S. Pat. Nos. 4,995,169, 4,343,090, 4,336,659 and 4,288,056. However, each of these patents is limited in that the moiré patterns are disclosed for indicating only an aligned or a non-aligned condition. That is, these moiré patterns are disclosed only for indicating whether the monitored condition is or is not at its "level" or zero reference point. The above-referenced U.S. Pat. No. 4,995,169 discloses that observation of the pattern will indicate whether the offset is in a positive or negative

2 direction from the zero reference. Thus, none of these patents discloses providing separately identifiable or unique indications of a number of increments of movement in either direction from a level or zero reference point. In U.S. Pat. No. 4,995,169, an additional external scale with angular markings is provided. This scale is utilized in connection with the moiré pattern to first set an arrow or indicator line at a zero position when the level condition is obtained, as indicated by the moiré pattern. Thereafter, when the vehicle or other object on which the indicator device is mounted is moved away from a level or horizontal condition, rotation of the moiré pattern back to its zero reference or level appearance should result in the arrow or indicator line being moved to an angular marking corresponding to the angular offset from the level or horizontal condition of the vehicle or other object on which the indicator is mounted. However, the moiré pattern in and of itself is incapable of providing any such incremental angular indications. It will be appreciated that the device that is presented in this patent is relatively complicated to assemble and operate, relying as it does on the alignment of the angular markings relative to the moiré pattern, and on the operator accuracy both in initially zeroing and later manipulating the device.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements throughout the several views, and in which:

FIG. 3 is an illustration showing further details of the configuration of a pattern generator in accordance with the embodiment of FIG. 2; and FIG. 4 is an illustration of the pattern generator of FIG. 3, indicating a zero angular offset condition.

DETAILED DESCRIPTION OF THE ILLUSTRATED EMBODIMENT

Figure 1:
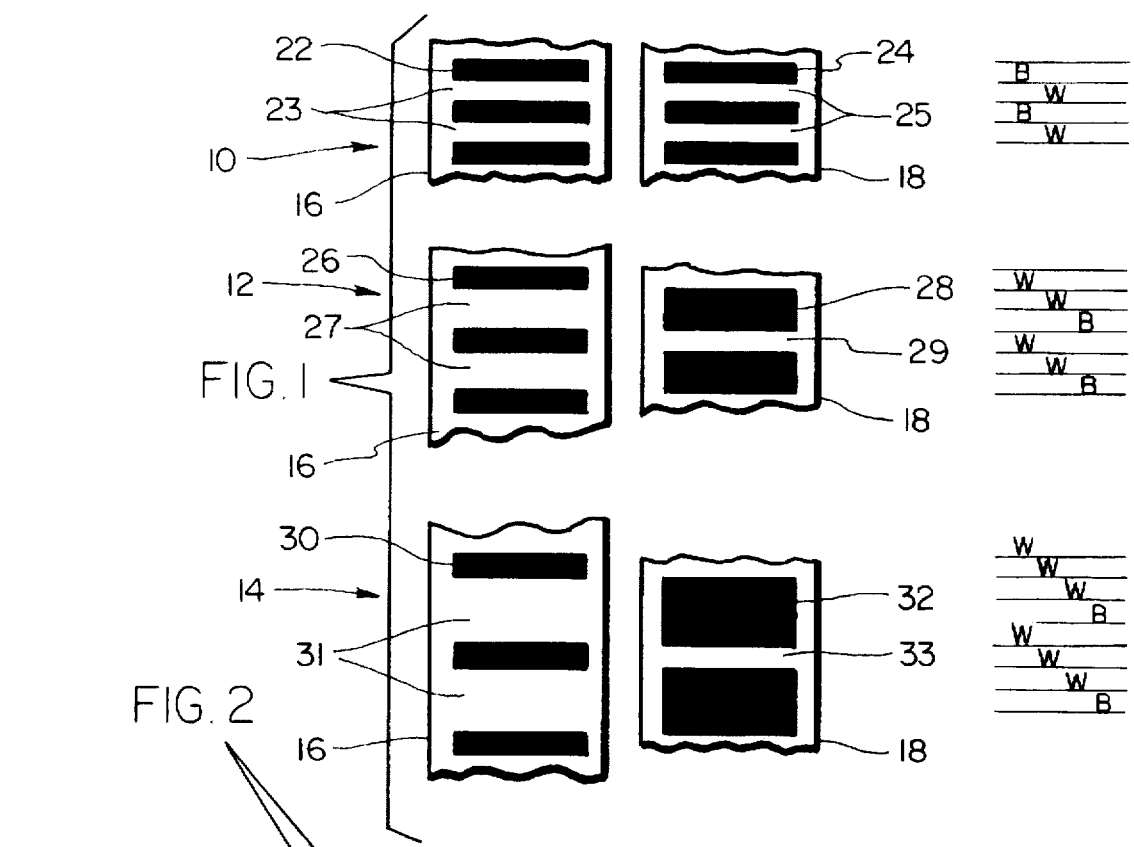
FIG. 1 is an enlarged illustration of a plurality of elements of a pattern generator in accordance with one form of the invention.

Referring now to the drawings and initially to FIG. 1, there is illustrated in somewhat diagrammatic form a set of pattern generating units in accordance with the invention. These pattern generating units are configured and may be arranged, as will be described, for providing a visual indication of increments of position over a predetermined range of positions to either side of, and including, a zero reference point. These pattern generating units in accordance with the invention are configured for producing a unique and identifiable set of patterns for each of the plurality of increments within this predetermined range to either side of a zero reference point.

Figure 2:
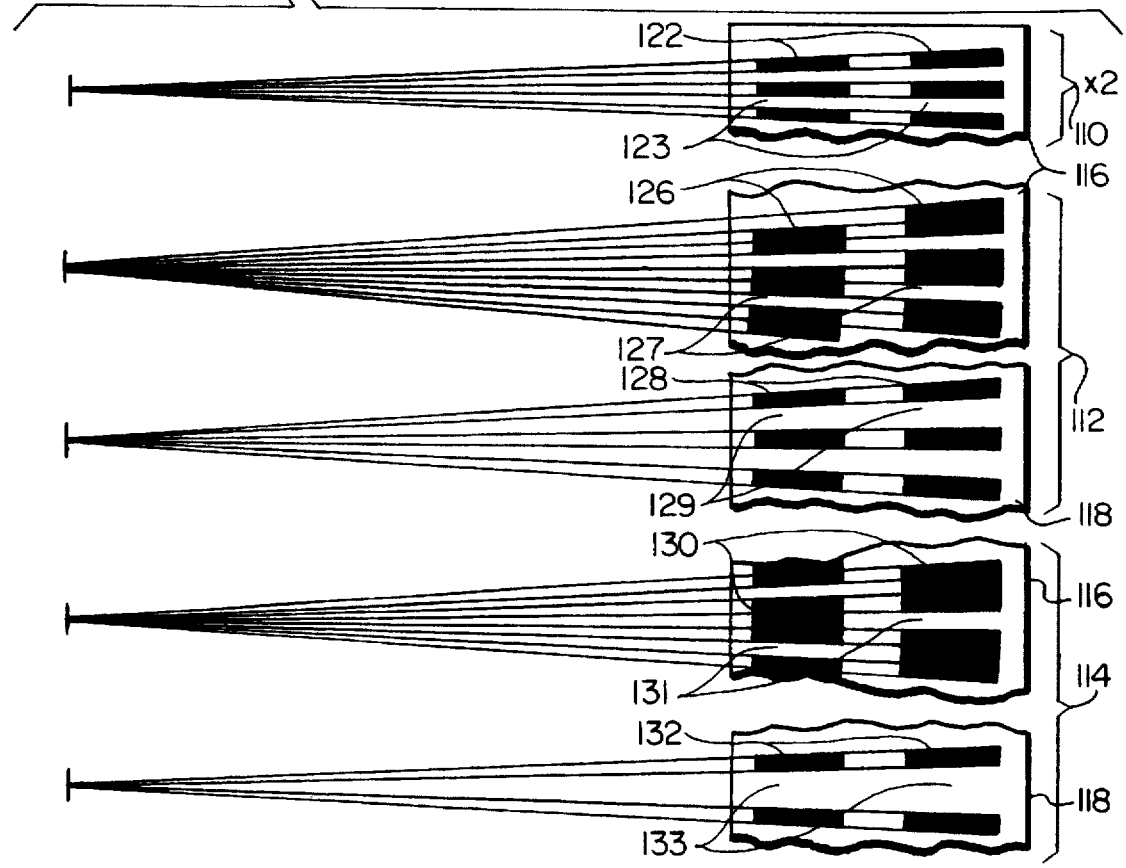
FIG. 2 is an illustration of a plurality of elements of a pattern generator in accordance with another form of the invention.

In FIG. 1, a plurality of pattern generating units are diagrammatically illustrated for achieving such sets of patterns in response to relative linear movement between two members or surfaces. In FIG. 2, there is illustrated a similar set of pattern generating units constructed in accordance with the invention for measuring relative angular displacement between two members or surfaces.

In FIG. 1, three such pattern generators or generating units are shown and indicated by reference numerals 10, 12 and 14. Each of the pattern generators 10, 12, and 14 includes first and second surfaces 16, 18. In the illustrated embodiment, one half or portion of each of the pattern generators 10, 12 and 14 is located on each of the two surfaces 16, 18. The first pattern generating unit 10 includes a plurality of spaced-apart opaque areas 22 formed on the first surface 16 and a plurality of spaced-apart opaque areas 24 formed on the second surface 18. Similarly, the remaining two pattern generating units 12 and 14 include first and second spaced-apart opaque areas 26, 28 and 30, 32 respectively, formed on the surfaces 16 and 18. In accordance with the invention, a translucent area is defined intermediate respective ones of the opaque areas. Thus, in the illustrated embodiment, these translucent areas are indicated by reference numerals 23 and 25, 27 and 29, 31 and 33 in the respective pattern generating units 10, 12 and 14. These respective opaque and transparent bars or areas may be created by placing a series of dark bars on a translucent or transparent surface such as a sheet of a transparent plastic material or the like.

In operation, one of the two surfaces 16, 18 is superimposed on the other such that the respective areas 22 and 24, 26 and 28, 30 and 32 are respectively superimposed for creating patterns as the spaced-apart opaque areas are moved linearly relative to each other. In the illustrated embodiment, these opaque areas 22, 24, 26, 28, 30 and 32 comprise elongate opaque bars, such that movement in the direction transverse to the length of these bars will produce a desired pattern when they are respectively superimposed as just described.

In accordance with the invention, a unique series of patterns is produced by the respective pattern generating units 10, 12, 14 by selecting the respective cross-sectional dimensions or widths of the respective opaque areas or bars and of the translucent areas or spaces therebetween. In the illustrated embodiment, the cross-sectional dimension or width of each of the opaque areas or bars is a dimension ML, and the cross-sectional dimension or width of each of the intermediate translucent areas is NL, where M and N are integers and L is the smallest increment of position to be measured. Thus, for example, if it desired to measure linear movement in increments of one millimeter, the dimension L is equal to one millimeter.

The three pattern generating units 10, 12 and 14 are provided with differing respective cross-sectional dimensions of the opaque areas and translucent areas by varying the integers M and N utilized in each instance. In the illustrated embodiment, in the first pattern generator 10, these integers M and N are equal to one on both of the surfaces 16 and 18. Thus, the opaque bars 22 and 24, as well as the translucent spaces 23 and 25, are all of width L.

In the second pattern generator 12, on the surface 16 the integer M is equal to one and the integer N is equal to two, while on the surface 18 the integer M is equal to two and the integer N is equal to one. Thus, on the surface 16 the opaque bars 26 are all of a width L, while the spaces 27 therebetween are of a width 2L, while on surface 18 the opaque bars 28 are of a width 2 L, with translucent areas 29 of width L therebetween.

Finally, in the third pattern generating unit 14, on the surface 16 the integer M is equal to one and the integer N is equal to three, while on the surface 18 integer M is equal to three and integer N is equal to one. Thus, on the surface 16 the opaque bars 30 are width L with translucent spaces 31 of width 3L therebetween, while on the surface 18 the opaque bars 32 are of width 3L with translucent areas 33 of width L therebetween.

Accordingly, and referring to the right-hand side of each of the pattern generating units of FIG. 1, the respective opaque areas will either prevent or permit transmittal of light through the translucent areas, depending upon the relative alignment of opaque areas between the two surfaces 16 and 18 in each of the pattern generating units. These two conditions are referred to as "black" (B) and "white" (W) in the drawings.

Thus, in the pattern 10, for each increment of relative movement L between the two surfaces 16 and 18, the pattern will shift from white to black or vice-versa, as indicated by the letters W and B at equal increments L alongside the unit 10. Similarly, in the pattern generating unit 12, for increments of relative movement L between the surfaces 16 and 18, a series of indications will be given of two whites followed by a black or WWB, as indicated alongside of this unit. Finally, in the third pattern generating unit, with successive increments of relative movement L the series of patterns generated will be three whites and one black (WWWB).

Referring briefly to FIG. 2, a similar set of pattern generators for measuring angular increments of movement, at an incremental angle a, is illustrated. Thus, in this embodiment, the unit of measurement L of FIG. 1 comprises a unit of angular measurement $\alpha$. Thus, for example, if the smallest desired unit of measurement is 0.1°, then the angle $\alpha$ is equal to 0.1°. In most respects, the pattern generating units and their series of opaque areas and translucent areas are formed with the same relative cross-sectional dimensions as described above with reference to FIG. 1. However, these dimensions are angular measurements, such that each of the opaque areas and translucent areas in effect comprises a segment of a sector of a circle.

Therefore, the respective elements of FIG. 2 are indicated by like reference numerals to those utilized in FIG. 1 together with the prefix 1; such that the first pattern generating unit is designated 110, the second 112, and the like etc. However, for the unit 110, only the first surface 116 is shown, it being understood that the pattern of opaque and translucent areas will be identical on the second surface, as indicated by the marking X2.

Accordingly, pattern generating unit 110 has opaque bars 122 of angular extent $\alpha$ and translucent areas 123 of angular extent $\alpha$. Pattern generating unit 112 has, on surface 116, opaque bars 126 of angular extent $2\alpha$ and translucent areas 127 of angular extent $\alpha$; and on surface 118, opaque bars 128 of angular extent $\alpha$ and translucent spaces 129 of angular extent $2\alpha$. Finally, pattern generating unit 114 has, on surface 116, opaque bars 130 of angular extent $3\alpha$ and translucent areas 131 of angular extent $\alpha$, and on surface 118, opaque bars 132 of angular extent $\alpha$ and translucent areas 133 of angular extent $3\alpha$.

As with the embodiment of FIG. 1, these patterns of opaque areas and translucent areas may be formed by superimposing a plurality of such spaced-apart opaque segments of circular sectors upon a translucent surface such as a transparent sheet of plastic or the like. The respective sets of opaque and translucent areas defined in FIG. 2 of each pattern generating unit are aligned along radial lines which emanate from a common center point for each of the two surfaces.

In the embodiment illustrated in FIG. 2, each of the pattern generating units 110, 112, 114 includes, on each surface 116, 118, two sets of opaque bars and translucent areas, spaced at different radial distances from a common center point. In pattern generating units 112 and 114, on the surface 116, the respective opaque bars of these two sets are angularly offset. This angular offset is a for unit 112 and 2α for unit 114.

Referring now to FIG. 3, an embodiment of the invention constructed in accordance with the principles illustrated in FIG. 2 is shown. In FIG. 3, respective sections of pattern generating units are indicated by suffixes "a" and "b" for the sections on the surface 116, and by suffixes "c" and "d" for the sections on the surface 118. As mentioned above, each of the pattern generating units of FIG. 2 includes two sets of pattern generating groups of opaque areas which are aligned along radial lines emanating from a common center point for each surface. This results in two pattern generating areas or "blocks" for each of the pattern generating units, for a total of six such pattern generating blocks, as best seen in FIG. 4. In FIG. 4, wherein surfaces 116 and 118 are superimposed, for simplicity, these blocks are designated 1, 2, 3, 4, 5 and 6. As in FIG. 2, the two sets of opaque bars are angularly offset in units 112 and 114.

In the embodiment illustrated in FIGS. 3 and 4, the angular increment a is equal to 0.180 and the patterns are arranged for displaying a unique set of patterns for each such angular increment of movement of 0.180 between the surfaces 116 and 118 over a range of ±1.260 to either side of a zero reference point.

In order to aid in aligning the respective pattern generating units formed on the respective surfaces 116 and 118, the embodiment of FIG. 3 provides a pair of perpendicular axes, one of which forms a zero reference radius with respect to the pattern generating units. These axes are indicated by reference numerals 50, 52 on the surface 116, and reference numerals 54, 56 on the surface 118. In addition, on the surface 118 there are formed an additional two radial lines 58, 60 emanating from the same center point as the axis 54. These lines 58 and 60 indicate a range of angular movement of ±1.26° from the center axis 54 which forms the zero reference point for angular movement in the illustrated embodiment.

Referring to FIG. 4, the pattern generating units of FIG. 3 are shown superimposed with zero angular offset, that is, with the axis 50 aligned with axis 54. As mentioned above, in FIG. 4 six "blocks" are defined, which are numbered from 1 through 6. These "blocks" display a unique pattern for each 0.18° of angular movement from −1.26° to +1.26°.

Referring to Table 1 hereinbelow, the patterns in accordance with the illustrated embodiment will give a unique set of so-called "black" (B) and "white" (W) indications, as described hereinabove, for each 0.18° increment of movement to either side of the zero reference point, that is, alignment of the axis 50 with the axis 54. It should be remembered that the designation of "B" for black indicates that respective opaque bars or areas are aligned such that no light passes through a given one of the blocks, whereas the indication "W" for white indicates that light will be visible through translucent areas between the opaque areas, that is, that some of the opaque areas of the respective surfaces 16 and 18 are superimposed, leaving some portions of the translucent areas exposed therebetween.

It will be recognized that other patterns may be utilized, giving incremental indications of other increments of linear movement or angular movement without departing from the invention.

While particular embodiments of the invention have been shown and described in detail, it will be obvious to those skilled in the art that changes and modifications of the present invention, in its various aspects, may be made without departing from the invention in its broader aspect, some of which changes and modifications are matters of routine engineering or design, while others are apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

TABLE 1

|       | 1 | 2 | 3 | 4 | 5 | 6 |
|-------|---|---|---|---|---|---|
| 1.26  | B | W | W | W | B | W |
| 1.08  | W | B | W | B | W | W |
| .90   | B | W | B | W | W | W |
| .72   | W | B | W | W | W | B |
| .54   | B | W | W | B | B | W |
| .36   | W | B | B | W | W | W |
| .18   | B | W | W | W | W | W |
| 0     | W | B | W | B | W | B |
| −.18  | B | W | B | W | B | W |
| −.36  | W | B | W | W | W | W |
| −.54  | B | W | W | B | W | W |
| −.72  | W | B | B | W | W | B |
| −.90  | B | W | W | W | B | W |
| −1.08 | W | B | W | B | W | W |
| −1.26 | B | W | B | W | W | W |

The invention is claimed as follows:

1. Apparatus for providing a visual indication of increments of position over a predetermined range of positions, said apparatus comprising:
   a plurality of pattern generating units;
   each one of said plurality of pattern generating units includes first and second surfaces;
   each one of said first and second surfaces has a plurality of spaced-apart opaque areas and a plurality of light-transmissive areas interposed between said spaced-apart opaque areas; and
   said second surface of each one of said plurality of pattern generating units is superimposed upon said first surface of each one of said Plurality of pattern generating units for creating a set of unique and identifiable patterns, in response to relative movement between said first and second surfaces and as defined between said opaque and light-transmissive areas of each one of said superimposed first and second surfaces of said plurality of pattern generating units, which is indicative of each one of said plurality of increments of position over said predetermined range.

2. Apparatus according to claim 1, wherein:
   in each one of said pattern generating units, each one of said opaque areas has a cross-sectional size dimension of ML and are spaced apart from each other by one of said light-transmissive areas which has a cross-sectional size dimension of NL, wherein M and N are integers and L is one of said increments of position.

3. Apparatus as set forth in claim 2, wherein:
   said cross-sectional size dimensions of said opaque areas defined upon said second surfaces of said plurality of pattern generating units differ from each other, and said cross-sectional size dimensions of said light-transmissive areas defined upon said first surfaces of said plurality of pattern generating units differ from each other.

4. Apparatus according to claim 1 wherein said increments of position are angular increments.

5. Apparatus according to claim 1, wherein:

each one of said plurality of opaque areas comprises a plurality of segments of angularly spaced sectors of a circle superimposed upon a translucent surface and defining translucent areas therebetween, comprising said light-transmissive areas, as a plurality of segments of angularly spaced sectors of said circle between said opaque areas.

6. Apparatus according to claim 5, wherein the respective opaque areas and translucent areas of said plurality of pattern generating units on each of said first and second surfaces are aligned along radial lines emanating from a common center point for each surface.

7. A pattern generator as set forth in claim 6, wherein:

said opaque areas disposed upon said first surface are angularly offset with respect to each other.

8. A pattern generator as set forth in claim 6, wherein:

said opaque areas and said translucent areas disposed upon said first and second surfaces are radially spaced from each other along said radial lines.

9. Apparatus according to claim 5 wherein on said second surface, each of said opaque areas has a cross-sectional dimension of L and each of said translucent areas has a cross-sectional dimension of NL, and on said first surface, each of said opaque areas has a cross-sectional dimension of ML and each of said translucent areas has a cross-sectional dimension of L.

10. Apparatus according to claim 9, wherein:

M and N have the same value within each one of said first and second surfaces of said pattern generating units, but wherein the value of M and N changes from a respective one of said first and second surfaces of said pattern generating units to the next.

11. Apparatus as set forth in claim 1, wherein:

said increments of position are linear increments.

12. Apparatus as set forth in claim 1, wherein:

said plurality of pattern generating units comprises three pattern generating units; and each one of said first and second surfaces of said three pattern generating units comprises a single pattern generating set.

13. Apparatus as set forth in claim 1, wherein:

said plurality of pattern generating units comprises three pattern generating units; and each one of said first and second surfaces of said three pattern generating units comprises two laterally spaced pattern generating sets.

14. A pattern generator for giving a visual indication of increments of position, comprising:

a first surface and a second surface;

each one of said first and second surfaces has a plurality of pattern generating sets formed thereon;

each one of said pattern generating sets comprises a plurality of spaced apart opaque areas having a cross-sectional dimension of ML and a plurality of translucent areas interposed between said opaque areas and having a cross-sectional dimension of NL; and said second surface is superimposed upon said first surface so as to create a plurality of unique and identifiable patterns, in response to relative movement between said first and second surfaces and as defined between said pattern generating sets of said plurality of spaced apart opaque areas and said plurality of translucent areas of said first and second surfaces, which are respectively indicative of each one of said plurality of increments of position, wherein M and N are integers and L comprises one increment of relative movement.

15. A pattern generator according to claim 14, wherein:

each one of said plurality of opaque areas comprises a plurality of segments of angularly spaced sectors of a circle superimposed upon a translucent surface and defining said translucent areas therebetween as a plurality of segments of angularly spaced sectors of said circle between said opaque areas.

16. A pattern generator according to claim 15 wherein the respective opaque areas and translucent areas of said plurality of pattern generating sets on each of said first and second surfaces are aligned along radial lines emanating from a common center point for each surface.

17. A pattern generator as set forth in claim 16, wherein:

said opaque areas disposed upon said first surface are angularly offset with respect to each other.

18. A pattern generator as set forth in claim 16, wherein:

said opaque areas and said translucent areas disposed upon said first and second surfaces are radially spaced from each other along said radial lines.

19. A pattern generator according to claim 14 wherein on said second surface, each of said opaque areas has a cross-sectional dimension of L and each of said translucent areas has a cross-sectional dimension of NL, and on said first surface, each of said opaque areas has a cross-sectional dimension of ML and each of said translucent areas has a cross-sectional dimension of L.

20. A pattern generator according to claim 19, wherein:

M and N have the same value within each one of said first and second surfaces of said pattern generator, but wherein the value of M and N changes from one pattern to the next when a plurality of pattern generators are used together.

* * * * *